US011868060B2

(12) United States Patent
Watanabe et al.

(10) Patent No.: US 11,868,060 B2
(45) Date of Patent: Jan. 9, 2024

(54) IMAGE FORMING APPARATUS CAPABLE OF DETECTING DEVIATION BETWEEN EXPOSURE DEVICE AND PHOTOCONDUCTOR DRUM

(71) Applicant: KYOCERA Document Solutions Inc., Osaka (JP)

(72) Inventors: Masaru Watanabe, Osaka (JP); Kanako Kikuchi, Osaka (JP); Yasuaki Sakamoto, Osaka (JP); Ayato Morikami, Osaka (JP); Yuki Nakaiwa, Osaka (JP); Keisuke Oba, Osaka (JP); Koji Uno, Osaka (JP); Takuji Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/884,421

(22) Filed: Aug. 9, 2022

(65) Prior Publication Data

US 2023/0051298 A1 Feb. 16, 2023

(30) Foreign Application Priority Data

Aug. 10, 2021 (JP) ................................ 2021-130960

(51) Int. Cl.
*G03G 15/043* (2006.01)

(52) U.S. Cl.
CPC ................................ *G03G 15/043* (2013.01)

(58) Field of Classification Search
CPC ... G03G 15/043; G03G 15/50; G03G 15/5041
See application file for complete search history.

(56) References Cited

U.S. PATENT DOCUMENTS

2015/0261162 A1 9/2015 Kaneko et al.

FOREIGN PATENT DOCUMENTS

JP H06130767 A * 5/1994
JP 2015175953 A 10/2015

OTHER PUBLICATIONS

JP H06130767 A English machine translation, Hayashi, May 13, 1994 (Year: 1994).*

* cited by examiner

*Primary Examiner* — Thomas S Giampaolo, II
(74) *Attorney, Agent, or Firm* — Alleman Hall Creasman & Tuttle LLP

(57) ABSTRACT

An image forming apparatus includes a developing current detecting portion, a control portion, and a deviation detecting portion. The developing current detecting portion detects a developing current that flows between a developing device and a photoconductor drum during development of an electrostatic latent image. The control portion causes the exposure device to form electrostatic latent images of at least two patch images at different positions from each other and at different timings from each other in a main scanning direction. The deviation detecting portion detects deviation of one of the exposure device and the photoconductor drum with respect to the other based on a detection timing at which the developing current is detected during development of the electrostatic latent images of the at least two patch images.

3 Claims, 6 Drawing Sheets

IMAGE FORMING APPARATUS CAPABLE OF DETECTING DEVIATION BETWEEN EXPOSURE DEVICE AND PHOTOCONDUCTOR DRUM

INCORPORATION BY REFERENCE

This application is based upon and claims the benefit of priority from the corresponding Japanese Patent Application No. 2021-130960 filed on Aug. 10, 2021, the entire contents of which are incorporated herein by reference.

BACKGROUND

The present disclosure relates to an image forming apparatus.

In certain image forming apparatuses, a developing current flowing between a developer and a photoconductor drum when a diagonal line patch is formed is detected, and density unevenness is estimated based on a measured value of the developing current.

SUMMARY

The image forming apparatus according to the present disclosure includes a photoconductor drum, an exposure device, a developing device, a developing current detecting portion, a control portion, and a deviation detecting portion. The exposure device exposes the photoconductor drum and forms an electrostatic latent image. The developing device adheres toner to the electrostatic latent image and performs development. The developing current detecting portion detects developing current flowing between the developing device and the photoconductor drum during development. The control portion controls the exposure device and causes the exposure device to form electrostatic latent images of at least two patch images at different positions from each other and at different timings from each other in a main scanning direction. The deviation detecting portion detects deviation of one of the exposure device and the photoconductor drum with respect to the other based on a detection timing at which the developing current is detected during development of the electrostatic latent images of the at least two patch images.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment according to the present disclosure will be described below based on the drawings.

Figure 1:
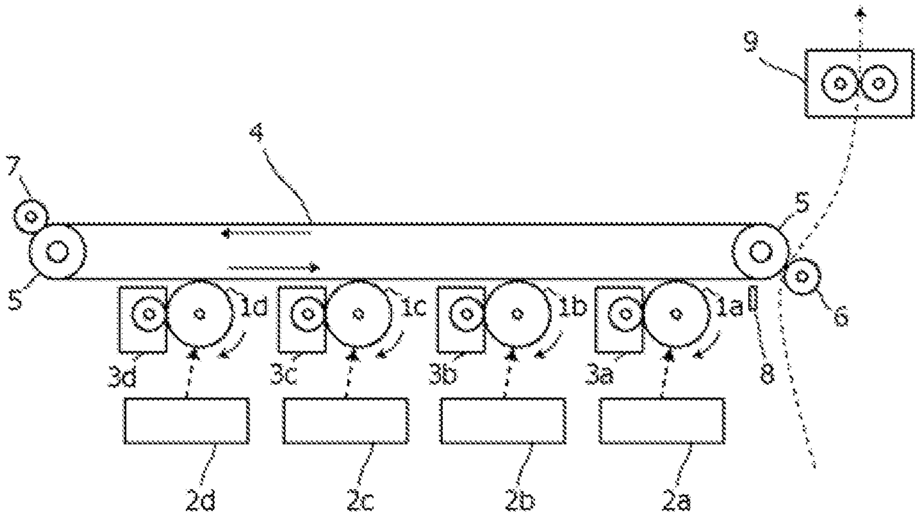
FIG. 1 is a side view showing part of an internal configuration of an image forming apparatus of an embodiment according to the present disclosure.

FIG. 1 is a side view showing part of an internal configuration of an image forming apparatus of an embodiment according to the present disclosure. The image forming apparatus shown in FIG. 1 is an apparatus such as a printer, a facsimile apparatus, a copying machine, or a multifunction peripheral having an electrophotographic printing function.

The image forming apparatus of this embodiment has a tandem type color developing device. This color developing device has photoconductor drums 1*a* to 1*d*, exposure devices 2*a* to 2*d*, and color developing devices 3*a* to 3*d*. The photoconductor drums 1*a* to 1*d* are photosensitive bodies corresponding to the four colors, cyan, magenta, yellow and black. The exposure devices 2*a* to 2*d* are devices configured to expose the photoconductor drums 1*a* to 1*d* to form electrostatic latent images by irradiating the photoconductor drums 1*a* to 1*d* with a laser beam. The exposure devices 2*a* to 2*d* include a laser diode that is a light source of a laser beam, and optical elements (lenses, mirrors, polygon mirrors, and the like) that guide the laser beam to the photoconductor drums 1*a* to 1*d*, and by irradiating the photoconductor drums 1*a* to 1 *d* with light, form electrostatic latent images on the photoconductor drums 1*a* to 1*d*.

Toner containers filled with toner of the four colors cyan, magenta, yellow and black are connected to the developing devices 3*a* to 3*d*. The developing devices 3*a* to 3*d* perform development (formation of toner images) using the toner supplied from the toner containers. More specifically, a developing bias is applied to each of the developing devices 3*a* to 3*d*. As a result, the developing devices 3*a* to 3*d* adhere toner to the electrostatic latent images on the photoconductor drums 1*a* to 1*d* based on the respective potential differences between the developing devices 3*a* to 3*d* and the photoconductor drums 1*a* to 1*d*. In this embodiment, for example, a two-component developer is used. In the developing devices 3*a* to 3*d*, the toner is stirred together with a carrier.

Development of magenta is performed by the photoconductor drum 1*a*, the exposure device 2*a*, and the developing device 3*a*. Development of cyan is performed by the photoconductor drum 1*b*, the exposure device 2*b*, and the developing device 3*b*. Development of yellow is performed by the photoconductor drum 1*c*, the exposure device 2*c*, and the developing device 3*c*. Development of black is performed by the photoconductor drum 1*d*, the exposure device 2*d*, and the developing device 3*d*.

Figure 2:
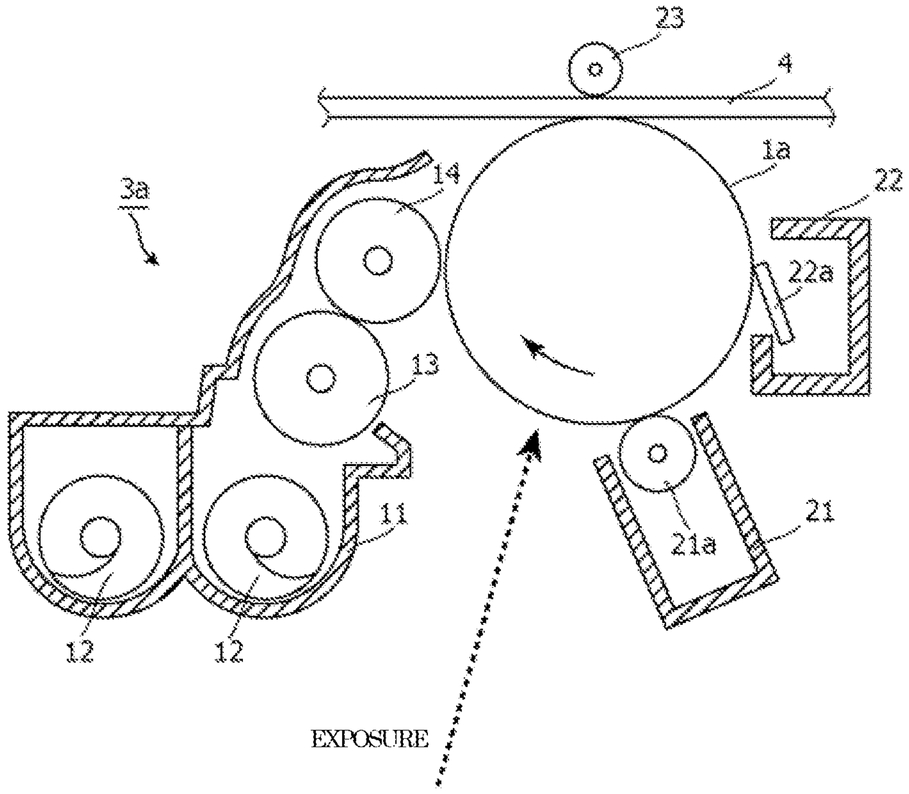
FIG. 2 is a diagram showing an example of peripheral devices around the photoconductor drum 1*a* in FIG. 1.

FIG. 2 is a diagram showing an example of peripheral devices around the photoconductor drum 1*a* in FIG. 1. Note that FIG. 2 shows various devices around the photoconductor drum 1*a*; however, the same configuration is also provided around the photoconductor drums 1*b* to 1*d*.

As shown in FIG. 2, in addition to the developing device 3*a*, a charging device 21 and a cleaning device 22 are provided around the photoconductor drum 1*a*. The charging device 21 charges the photoconductor drum 1*a* with a specified charging bias. In this embodiment, the charging device 21 includes a charging roller 21*a* that comes into contact with the photoconductor drum 1*a*, and the charging roller 21*a* charges the photoconductor drum 1*a*. The cleaning device 22 includes a cleaning blade 22*a* that comes into contact with the photoconductor drum 1*a*, and collects residual toner on the photoconductor drum 1*a*. In addition, a primary transfer roller 23 is provided at a position facing the photoconductor drum 1*a* with an intermediate transfer belt 4 interposed therebetween.

The developing device 3*a* includes a housing 11, stirring screws 12, a magnetic roller 13, and a developing roller 14. A toner container (not shown) is connected to the developing device 3*a*, and toner is supplied from the toner container into the housing 11 via a supply port (not shown). In the housing 11, the two-component developer including the toner and the carrier is stirred by the stirring screws 12. A magnetic material is used for the carrier.

The magnetic roller 13 holds the two-component developer in a brush shape on a surface thereof, and supplies the toner in the two-component developer to the developing roller 14. The toner of the two-component developer is transferred to the developing roller 14 according to a voltage difference between the magnetic roller 13 and the developing roller 14.

The developing roller 14 holds the toner transferred from the magnetic roller 13 on the surface thereof as a thin toner layer. A developing bias is applied to the developing roller 14. The toner layer formed on the surface of the developing roller 14 is transferred to the photoconductor drum 1*a* by the voltage of the photoconductor drum 1*a* with respect to the developing roller 14 (difference between the developing bias and the surface potential of the photoconductor drum 1*a*). That is, the developing roller 14 holds the toner by the developing bias and causes the toner to adhere to the electrostatic latent image.

Returning to FIG. 1, the intermediate transfer belt 4 is an image-carrying member that carries a toner image transferred from the photoconductor drums 1*a* to 1*d*, and is an endless (in other words, annular) intermediate transfer body. The intermediate transfer belt 4 is stretched around drive rollers 5, and by a driving force from the drive rollers 5, moves in a circulating motion in a direction from a contact position with the photoconductor drum 1*d* to a contact position with the photoconductor drum 1*a*.

That is, the toner image obtained by adhering the toner to the electrostatic latent image is primarily transferred to the intermediate transfer belt 4.

A secondary transfer roller 6 brings conveyed paper into contact with the intermediate transfer belt 4 and secondarily transfers the toner image on the intermediate transfer belt 4 to the paper. Note that the paper on which the toner image is transferred is conveyed to a fixing device 9, and the toner image is fixed on the paper.

A roller 7 has a cleaning brush, and by bringing the cleaning brush into contact with the intermediate transfer belt 4, removes the toner remaining on the intermediate transfer belt 4 after the secondary transfer of the toner image to the paper. Note that a cleaning blade may be used instead of the roller 7 having the cleaning brush.

A sensor 8 is a reflective optical sensor that detects toner on the intermediate transfer belt 4, and in order to detect the toner density in calibration, irradiates light onto the intermediate transfer belt 4 and detects the reflected light. In calibration, the sensor 8 irradiates light onto a predetermined area through which a test toner pattern formed on the intermediate transfer belt 4 passes, detects the reflected light of the light, and outputs an electric signal corresponding to the detected amount of light.

Figure 3:
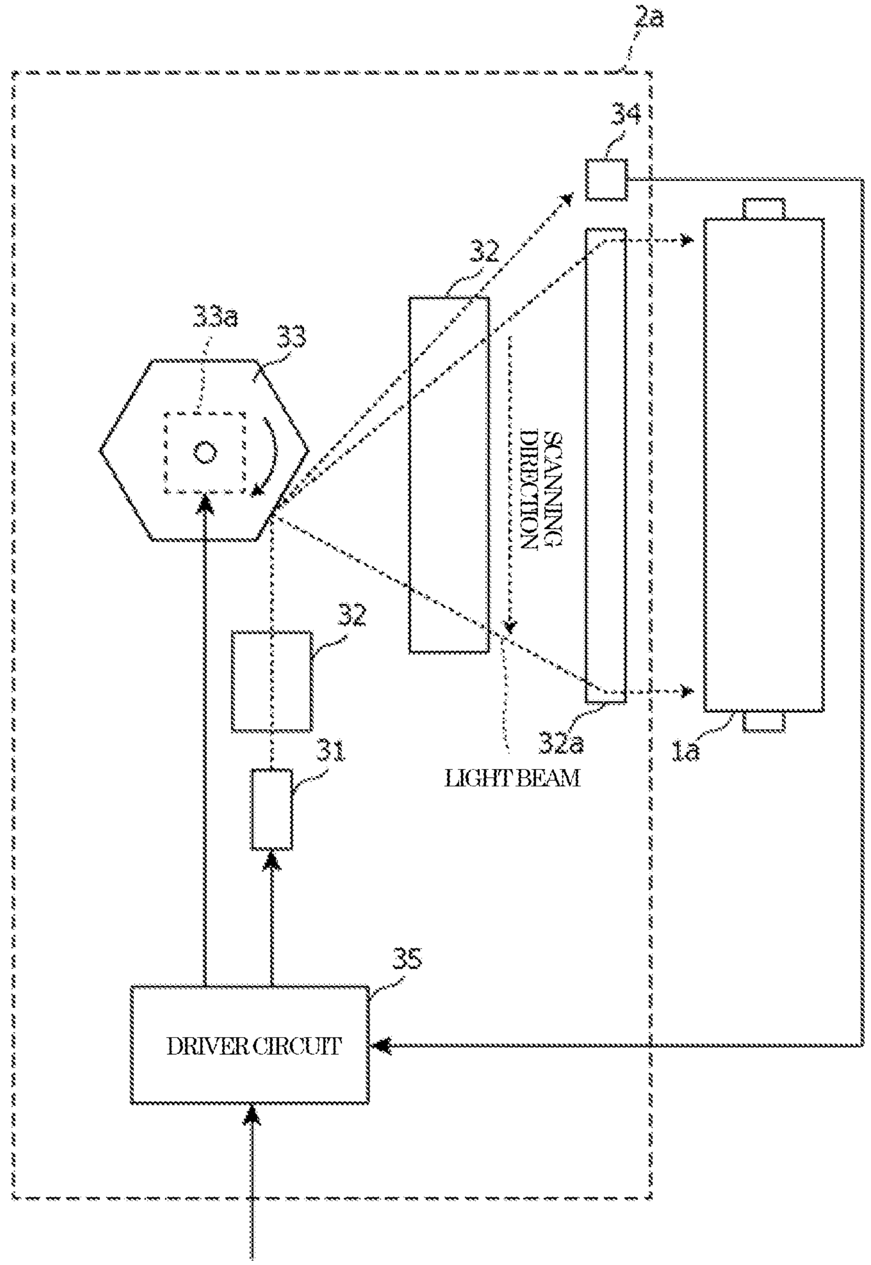
FIG. 3 is a diagram showing an example of a configuration of the exposure device 2*a* in FIG. 1.

FIG. 3 is a diagram showing an example of a configuration of the exposure device 2*a* in FIG. 1. Note that the exposure devices 2*b* to 2*d* corresponding to the photoconductor drums 1*b* to 1*d* have the same configuration as the exposure device 2*a* shown in FIG. 3.

In FIG. 3, a laser diode 31 is a light source that emits a laser beam for exposure. An optical system 32 is a group of various lenses arranged between the laser diode 31 and a polygon mirror 33 and/or between the polygon mirror 33 and the photoconductor drum 1*a* and between the polygon mirror 33 and a PD sensor 34. A collimator lens, a cylinder lens, an aperture, an fθ lens, or the like is used for the optical system 32. In addition, the optical system 32 includes a mirror 32*a* parallel to a scanning direction of the laser beam.

Further, the polygon mirror 33 is an element having an axis perpendicular to an axis of the photoconductor drum 1*a*, a polygonal cross section perpendicular to the axis, and a side surface as a mirror. The polygon mirror 33 rotates about its axis and scans the laser beam emitted from the laser diode 31 along an axial direction (main scanning direction) of the photoconductor drum 1*a*. This laser beam is reflected by the mirror 32*a* so as to be incident on the photoconductor drum 1*a*.

A polygon motor unit 33*a* rotates the polygon mirror 33 according to a control signal from a driver circuit 35.

In addition, the PD sensor 34 is a sensor that receives the laser beam scanned by the polygon mirror 33 at a predetermined position in order to generate a main scanning synchronization signal. When light is incident, the PD sensor 34 induces an output voltage according to the amount of light. The PD sensor 34 is arranged at a predetermined position on a line on which light is scanned, detects a timing at which a spot of light passes through that position, and outputs a pulse formed at the timing as a main scanning synchronization signal.

The driver circuit 35, together with controlling the laser diode 31 according to a set value for the amount of exposure light specified from the controller 42, as will be described later, and causing the laser diode 31 to emit a laser beam, controls the polygon motor unit 33*a* to rotate the polygon mirror 33 at a predetermined rotation speed. The driver circuit 35, in synchronization with the main scanning synchronization signal, controls the laser diode 31 so that exposure is performed by the laser beam in a pattern corresponding to the image to be formed.

A deviation (skewing, bowing, or the like) may occur between the exposure device 2*a* and the photoconductor drum 1*a* due to an attachment error of the exposure device 2*a* and the photoconductor drum 1*a*, a temperature change, or the like. However, with a conventional image forming apparatus, such deviation (skewing, bowing, or the like) is difficult to detect.

Usually, the above-mentioned deviation is measured by detecting a position of a patch formed on printing paper or the intermediate transfer belt 4 with a sensor, and thus printing paper is consumed and the measurement time becomes relatively long.

On the other hand, in the image forming apparatus of an embodiment according to the present disclosure, as will be described below, it is possible to detect deviation of one of the exposure device 2*a* and the photoconductor drum 1*a* with respect to the other in a relatively short time.

Figure 4:
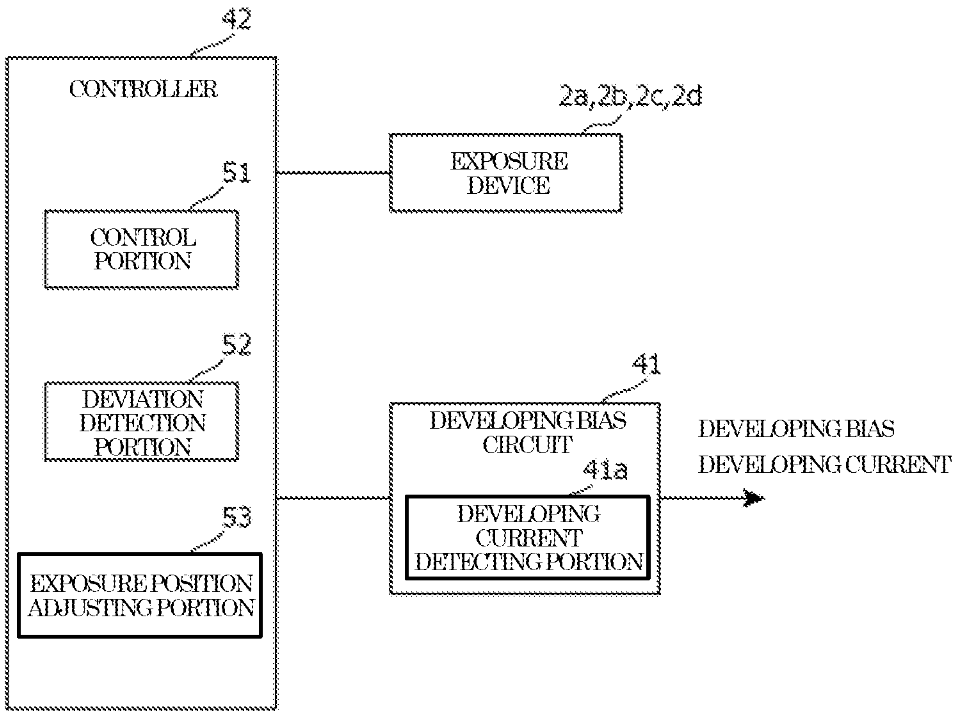
FIG. 4 is a block diagram showing a part of an electrical configuration of the image forming apparatus of an embodiment according to the present disclosure.

FIG. 4 is a block diagram showing a part of an electrical configuration of the image forming apparatus of an embodiment according to the present disclosure. As shown in FIG. 4, the image forming apparatus further includes a developing bias circuit 41 and a controller 42.

The developing bias circuit 41 applies a developing bias of a voltage specified according to a control signal between the developing devices 3a, 3b, 3c, 3d and the photoconductor drums 1a, 1b, 1c, 1d, respectively. The developing bias circuit 41 includes a developing current detecting portion 41a. The developing current detecting portion 41a detects a developing current (direct current value) flowing between the developing device and the photoconductor drum when developing a patch image.

The controller 42 is, for example, a processing circuit including a computer operated by a control program, an Application Specific Integrated Circuit (ASIC), and the like, and operates as a control portion 51, a deviation detecting portion 52, and an exposure position adjusting portion 53.

The control portion 51 controls the photoconductor drums 1a to 1d, the exposure devices 2a to 2d, the developing devices 3a to 3d, the charging device 21, and the like to form an electrostatic latent image of an image to be printed, and develop, transfer and fix a toner image corresponding to the electrostatic latent image, and also to supply and discharge printing paper.

In addition, when detecting a deviation of one of the corresponding exposure devices 2a, 2b, 2c, 2d and the photoconductor drums 1a, 1b, 1c, 1d with respect to the other, the control portion 51 controls the respective exposure devices 2a, 2b, 2c, 2d and causes the exposure devices 2a, 2b, 2c, 2d to form electrostatic latent images of at least two patch images at different positions from each other and at different timing from each other in the main scanning direction.

The deviation detecting portion 52 detects the deviation based on the detection timing at which the developing current is detected when developing the electrostatic latent images of at least two patch images.

In this embodiment, the deviation detecting portion 52 detects the above-mentioned deviation based on a reference distance between patch images based on the exposure timing specified by the control portion 51 for the exposure devices 2a, 2b, 2c, 2d, and a measurement distance between patch images based on the detection timing at which the developing current is detected during development of electrostatic latent images of at least two patch images.

Figure 5:
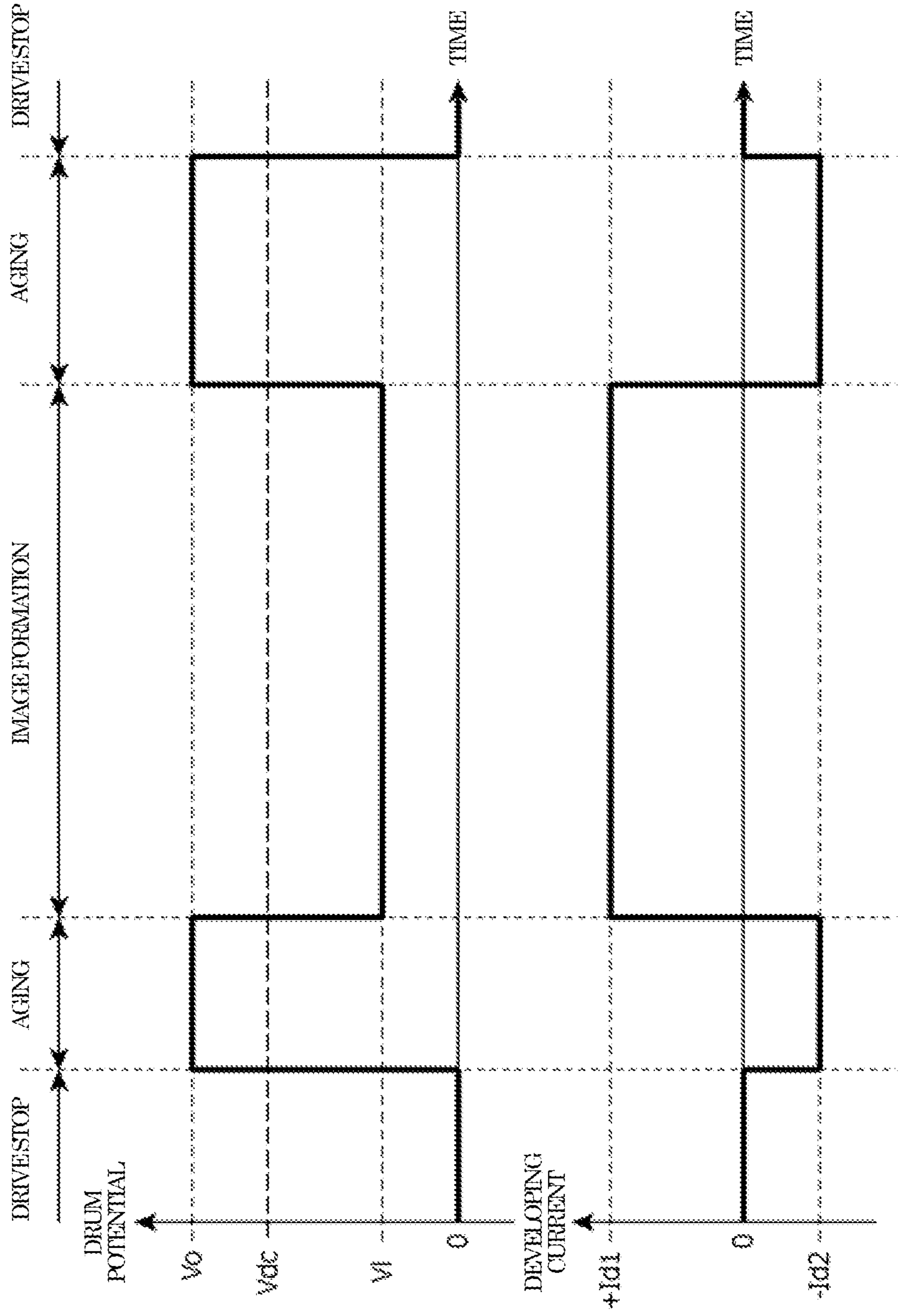
FIG. 5 is a diagram for describing a developing current in the image forming apparatus shown in FIG. 1.

FIG. 5 is a diagram for describing a developing current in the image forming apparatus shown in FIG. 1.

The surface potentials (drum potentials) of the photoconductor drums 1a, 1b, 1c, 1d are set to a predetermined potential Vo by the charging device 21. When the photoconductor drums 1a, 1b, 1c, 1d are exposed, the drum potentials drop to a potential VI according to the exposure amount, which is lower than the developing bias Vdc. Thus, a forward electric field in a direction from the developing devices 3a, 3b, 3c, 3d to the photoconductor drums 1a, 1b, 1c, 1d (that is, an electric field in the direction of adhering charged toner from the developing devices 3a, 3b, 3c, 3d to the photoconductor drums 1a, 1b, 1c, 1d) is generated, and due to the electric field, the toner moves from the developing devices 3a, 3b, 3c, 3d to the photoconductor drums 1a, 1b, 1c, 1d. The toner has an electric charge, and thus the movement of the toner is detected as the developing current. At that time, a substantially rectangular pulse-shaped developing current is detected.

The above-mentioned detection timing is one of timing of a rise, timing of a fall, or an intermediate timing between a rise and a fall in a substantially rectangular pulse-shaped developing current. Here, the above-mentioned detection timing is the central timing between the timing of a rise and the timing of a fall.

The exposure position adjusting portion 53 adjusts the exposure positions of the electrostatic latent images by the exposure devices 2a, 2b, 2c, 2d so that the detected deviation is reduced. For example, the exposure position adjusting portion 53 may (a) bring the above-mentioned deviation close to zero by correcting, for example, image data of the image to be printed and adjusting the exposure timing for each position in the main scanning direction; or (b) reduce the above-mentioned deviation by using a drive portion (not shown), to adjust, for example, the position and orientation of the mirror 32a, and mechanically adjust the tilt of the exposure devices 2a, 2b, 2c, 2d and/or the photoconductor drums 1a, 1b, 1c, 1d.

In a case where skewing (tilting) of the exposure devices 2a, 2b, 2c, 2d and/or the photoconductor drums 1a, 1b, 1c, 1d is detected as the above-mentioned deviation, the number of patch images may be two. In addition, in a case where bowing (curvature) of the exposure devices 2a, 2b, 2c, 2d and/or the photoconductor drums 1a, 1b, 1c, 1d is detected as the above-mentioned deviation, the number of patch images is three or more.

In addition, for the main scanning direction position other than the main scanning direction position where deviation was detected, the deviation at the position is derived, for example, by an existing interpolation method such as linear interpolation, and the exposure position is adjusted according to the deviation.

Next, the operation of the image forming apparatus will be described.

In a case of detecting deviation between the exposure devices 2a, 2b, 2c, 2d and the photoconductor drums 1a, 1b, 1c, 1d of each toner color in calibration or the like, the control portion 51 causes the exposure devices 2a, 2b, 2c, 2d to form electrostatic latent images of at least two patch images at different positions from each other and at different timings from each other in the main scanning direction.

At that time, the deviation detecting portion 52 monitors the developing current detected by the developing current detecting portion 41a, identifies the detection timing at which the developing current at the time of development of the electrostatic latent image of each patch image is detected, and detects deviation based on the identified detection timings.

Figure 6:
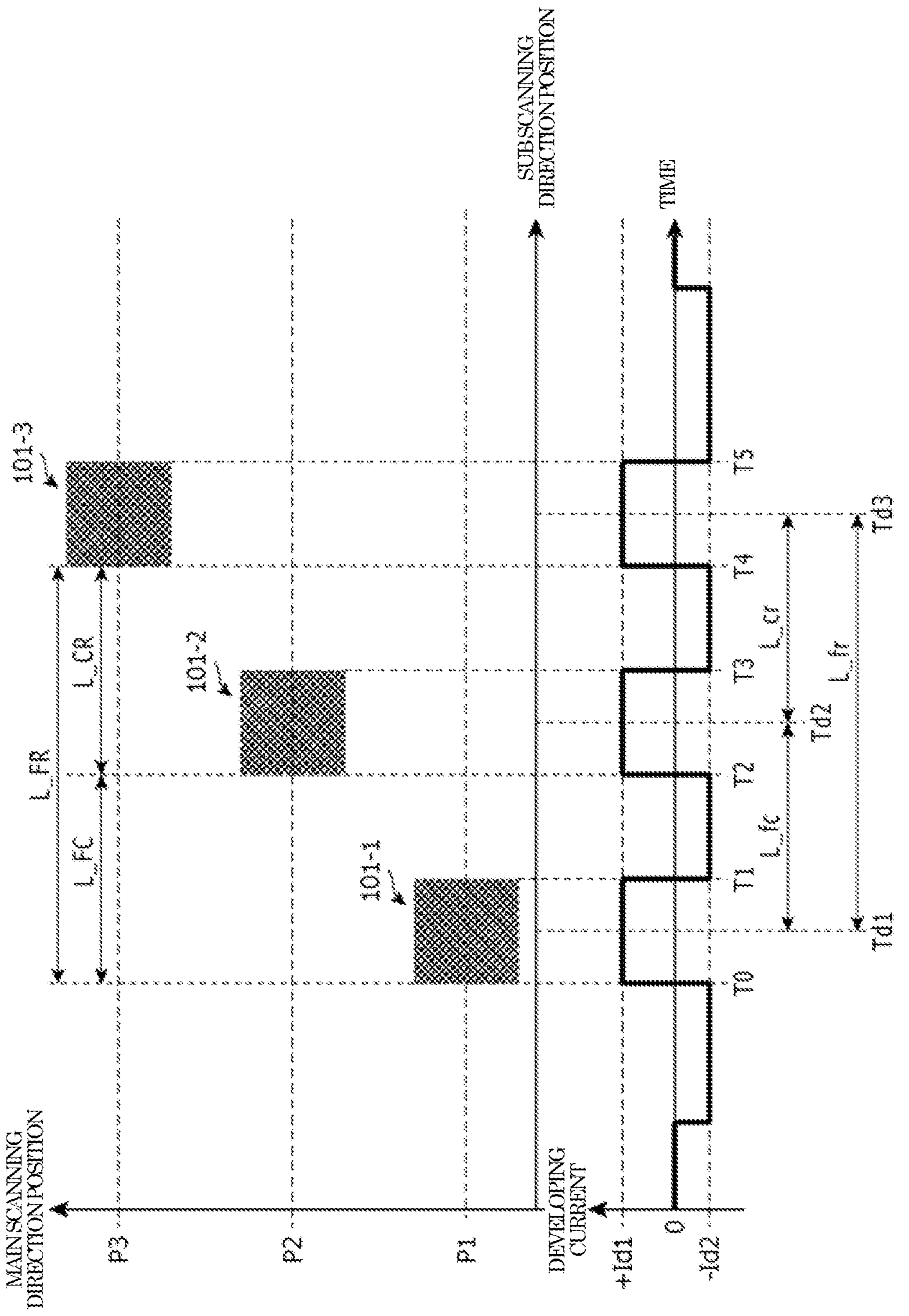
FIG. 6 is a diagram for describing detection of deviation based on a detection timing of the developing current.

FIG. 6 is a diagram for describing detection of deviation based on a detection timing of the developing current.

Here, for example, as shown in FIG. 6, at positions P1, P2, P3 in the main scanning direction, three patch images 101-1, 101-2, 101-3 are formed on the photoconductor drums 1a, 1b, 1c, 1d. Position P2 in the main scanning direction is the center in the axial direction of the photoconductor drums 1a, 1b, 1c, 1 d. Position P1 in the main scanning direction is a position on the front side in the axial direction of the photoconductor drums 1a, 1b, 1c, 1 d. Position P3 in the main scanning direction is a position on the rear side in the axial direction of the photoconductor drums 1a, 1b, 1c, 1 d.

The deviation detecting portion 52 (a) identifies the timings T0, T1, T2, T3, T4, T5 of a rise and fall of the developing currents during development of the electrostatic latent images of the patch images 101-1, 101-2, 101-3; (b) based on these timings T0, T1, T2, T3, T4, T5, identifies the detection timings Td1, Td2, Td3 (Td1=(T0+T1)/2, Td2=(T2+T3)/2, Td3=(T4+T5)/2) of the patch images 101-1, 101-2, 101-3; and (c) derives measurement distances L_fc, L_cr, L_fr (L_fc=(Td2−Td1)×V, L_cr=(Td3−Td2)×V, L_fr=(Td3−Td1)×V; V is the process linear speed) based on the detection timings Td1, Td2, Td3.

The deviation detecting portion 52 detects the above-mentioned deviations based on reference distances L_FC, L_CR, L_FR between patch images based on the exposure timings specified by the control portion 51 for the exposure devices 2*a*, 2*b*, 2*c*, 2*d*, and measurement distances L_fc, L_cr, L_fr between the patch images. The deviation detecting portion 52 calculates the differences (L_fc−L_FC), (L_cr−L_CR), (L_fr−L_FR) between the reference distances and the measurement distances of each patch image as the deviations (deviations in a sub scanning direction) at the positions in the main scanning direction of the patch images. In this way, the deviations for each of the plurality of toner colors are individually identified.

After that, the exposure position adjusting portion 53 adjusts the exposure positions of the electrostatic latent images by the exposure devices 2*a*, 2*b*, 2*c*, 2*d* so that the detected deviations are reduced.

The toner adhering to the patch images is removed by the cleaning device 22 and is not transferred to the intermediate transfer belt 4.

As described above, according to the embodiment, the developing current detecting portion 41*a* detects the developing current flowing between the developing devices 3*a*, 3*b*, 3*c*, 3*d* and the photoconductor drums 1*a*, 1*b*, 1*c*, 1*d* during development. The control portion 51 controls the exposure devices 2*a*, 2*b*, 2*c*, 2*d* and causes the exposure devices 2*a*, 2*b*, 2*c*, 2*d* to form electrostatic latent images of at least two patch images at different positions from each other and at different timings from each other in the main scanning direction. The deviation detecting portion 52 detects the deviation of one of the exposure devices 2*a*, 2*b*, 2*c*, 2*d* and the photoconductor drums 1*a*, 1*b*, 1*c*, 1*d* with respect to the other based on the detection timings at which the developing current is detected during development of the electrostatic latent images of the patch images described above.

Thus, the above-mentioned deviation is detected without transferring the patch image or measuring the density of the patch image, and thus the above-mentioned deviation can be detected in a relatively short time.

Various changes and modifications to the embodiment described above will be apparent to those skilled in the art. Such changes and modifications may be made without departing from the intent and scope of the subject and without diminishing the intended advantages. That is, it is intended that such changes and modifications shall be included in the claims.

For example, in the above embodiments, the positions of the patch images 101-1 to 101-N (N>1) in the main scanning direction are arbitrary, and in the main scanning direction, the patch images 101-1 to 101-N may be centrally arranged at specific local locations to be measured for deviation.

In addition, in the above embodiments, the intervals between two adjacent patch images 101-1 to 101-N (N>2) in the main scanning direction need not be uniform. Moreover, in the above embodiment, the intervals between two adjacent patch images 101-1 to 101-N (N>2) in the sub scanning direction need not be uniform.

Furthermore, in the above embodiments, the patch images 101-1 to 101-N (N>2) do not need to be formed in order along both the main scanning direction and the sub scanning direction as shown in FIG. 6.

The present disclosure is applicable to, for example, an electrophotographic image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:
- a photoconductor drum;
- an exposure device configured to expose the photoconductor drum and form an electrostatic latent image;
- a developing device configured to adhere toner to the electrostatic latent image and perform development;
- a developing bias circuit configured to detect developing current flowing between the developing device and the photoconductor drum during development; and
- a controller configured to operate as:
  - a control portion configured to control the exposure device and cause the exposure device to form electrostatic latent images of at least two patch images at different positions from each other and at different timings from each other in a main scanning direction; and
  - a deviation detecting portion configured to detect deviation of one of the exposure device and the photoconductor drum with respect to the other based on a first detection timing at which the developing current is detected during development of the electrostatic latent images of the at least two patch images, wherein
- the deviation detecting portion detects the deviation based on a reference distance between the patch images based on an exposure timing specified by the control portion for the exposure device and a measurement distance between the patch images based on the first detection timing at which the developing current is detected during development of the electrostatic latent images of the at least two patch images.

2. The image forming apparatus according to claim 1, wherein the controller is further configured to operate as
- an exposure position adjusting portion configured to adjust an exposure position of the electrostatic latent image by the exposure device so that the deviation is reduced.

3. The image forming apparatus according to claim 1, wherein
- the control portion controls the exposure device and causes the exposure device to form electrostatic latent images of at least three patch images at different positions from each other and at different timings from each other in the main scanning direction; and
- the deviation detecting portion detects deviation of one of the exposure device and the photoconductor drum with respect to the other based on a second detection timing at which the developing current is detected during development of the electrostatic latent images of the at least three patch images.

* * * * *